(12) United States Patent
Lo

(10) Patent No.: US 11,354,931 B2
(45) Date of Patent: Jun. 7, 2022

(54) FINGERPRINT SENSING DEVICE AND OPERATION METHOD THEREOF

(71) Applicant: Egis Technology Inc., Hsinchu (TW)

(72) Inventor: Wan-Jung Lo, Hsinchu (TW)

(73) Assignee: Egis Technology Inc., Hsinchu (TW)

( * ) Notice: Subject to any disclaimer, the term of this patent is extended or adjusted under 35 U.S.C. 154(b) by 0 days.

(21) Appl. No.: 17/317,914

(22) Filed: May 12, 2021

(65) Prior Publication Data

US 2022/0027595 A1    Jan. 27, 2022

Related U.S. Application Data

(60) Provisional application No. 63/055,855, filed on Jul. 23, 2020, provisional application No. 63/054,777, filed on Jul. 21, 2020.

(30) Foreign Application Priority Data

Apr. 1, 2021    (CN) .......................... 202110358158.6

(51) Int. Cl.
*G06V 40/13*         (2022.01)
*G06F 3/041*         (2006.01)

(52) U.S. Cl.
CPC ........ *G06V 40/1318* (2022.01); *G06F 3/0412* (2013.01); *G06F 3/04184* (2019.05); *G06V 40/13* (2022.01)

(58) Field of Classification Search
CPC .. G06V 40/1318; G06V 40/13; G06F 3/0412; G06F 3/04184
See application file for complete search history.

(56) References Cited

U.S. PATENT DOCUMENTS

| | | | |
|---|---|---|---|
| 2020/0134285 A1 | 4/2020 | Hung et al. | |
| 2020/0241725 A1* | 7/2020 | Jhang | G06F 3/04166 |
| 2021/0056333 A1* | 2/2021 | Cheng | G06V 40/28 |

FOREIGN PATENT DOCUMENTS

| | | |
|---|---|---|
| CN | 108337913 | 7/2018 |
| CN | 110414364 | 11/2019 |
| CN | 111103963 | 5/2020 |
| CN | 111158536 | 5/2020 |
| TW | I682328 | 1/2020 |
| TW | 202020638 | 6/2020 |

OTHER PUBLICATIONS

"Office Action of Taiwan Counterpart Application", dated Nov. 4, 2021, p. 1-p. 17.

* cited by examiner

*Primary Examiner* — Premal R Patel
(74) *Attorney, Agent, or Firm* — JCIPRNET

(57) ABSTRACT

A fingerprint sensing device and an operation method thereof are provided. The fingerprint sensing device includes a fingerprint sensor, a driver integrated chip, and a fingerprint sensing chip. The fingerprint sensing chip is coupled to the fingerprint sensor, and is coupled to the driver integrated chip via a general purpose input/output (GPIO) interface. The fingerprint sensing chip provides a control signal to the driver integrated chip via the GPIO interface to control the driver integrated chip according to the control signal to disable touch sensing during a fingerprint sensing period. The fingerprint sensing chip drives the fingerprint sensor to obtain a fingerprint image during the fingerprint sensing period.

15 Claims, 6 Drawing Sheets

FINGERPRINT SENSING DEVICE AND OPERATION METHOD THEREOF

CROSS-REFERENCE TO RELATED APPLICATION

This application claims the priority benefit of U.S. Provisional Application No. 63/054,777, filed on Jul. 21, 2020, U.S. Provisional Application No. 63/055,855, filed on Jul. 23, 2020, and China Application No. 202110358158.6, filed on Apr. 1, 2021. The entirety of each of the above-mentioned patent applications is hereby incorporated by reference herein and made a part of this specification.

BACKGROUND

Technical Field

The disclosure relates to a sensing device, and more particularly to a fingerprint sensing device and an operation method thereof.

Description of Related Art

With the development of touch technology and display technology, touch display devices have been widely applied to various electronic products, such as smart phones, tablet computers, or portable notebook computers. On the other hand, fingerprint recognition technology has gradually been widely applied to various electronic products, including at least capacitive, optical, ultrasonic, and other fingerprint recognition technologies that are continuously being developed and improved.

In order to provide the user with a more convenient experience, the in-display fingerprint recognition solution is getting more and more attention. If the electronic product has the in-display fingerprint recognition function, the user can simultaneously perform a touch operation and a fingerprint verification operation in the touch display region. As the fingerprint sensor is integrated with the touch display device, how to implement better touch performance and fingerprint sensing performance is a topic of concern to persons skilled in the art.

SUMMARY

The disclosure provides a fingerprint sensing device and an operation method thereof, which can accelerate communication speed between a fingerprint sensing chip and a driver integrated chip to implement a quick fingerprint sensing function.

An embodiment of the disclosure provides a fingerprint sensing device, which includes a fingerprint sensor, a driver integrated chip, and a fingerprint sensing chip. The fingerprint sensing chip is coupled to the fingerprint sensor, and is coupled to the driver integrated chip via a general purpose input/output (GPIO) interface. The fingerprint sensing chip provides a control signal to the driver integrated chip via the GPIO interface to control the driver integrated chip according to the control signal to disable touch sensing during a fingerprint sensing period. The fingerprint sensing chip drives the fingerprint sensor to obtain a fingerprint image during the fingerprint sensing period.

An embodiment of the disclosure provides an operation method of a fingerprint sensing device. The fingerprint sensing device includes a fingerprint sensor, a fingerprint sensing chip, and a driver integrated chip. The operation method includes the following steps. The fingerprint sensing chip is coupled to the driver integrated chip via a GPIO interface. The fingerprint sensing chip provides a control signal to the driver integrated chip via the GPIO interface to control the driver integrated chip according to the control signal to disable touch sensing during a fingerprint sensing period. The fingerprint sensor is driven to obtain a fingerprint image through the fingerprint sensing chip during the fingerprint sensing period.

Based on the above, in the embodiments of the disclosure, the fingerprint sensing chip communicates with the driver integrated chip through the GPIO interface. The fingerprint sensing chip may output the control signal to the driver integrated chip via GPIO pins of the GPIO interface, so that the driver integrated chip may disable a touch display panel for touch sensing according to a signal level of the control signal to avoid undesirable interference of touch sensing to fingerprint sensing, thereby improving the quality of fingerprint sensing. In addition, by using the fingerprint sensing chip to control the driver integrated chip through the GPIO interface, the embodiments of the disclosure have the effect of quickly completing a fingerprint sensing operation.

DETAILED DESCRIPTION OF DISCLOSED EMBODIMENTS

Figure 1:
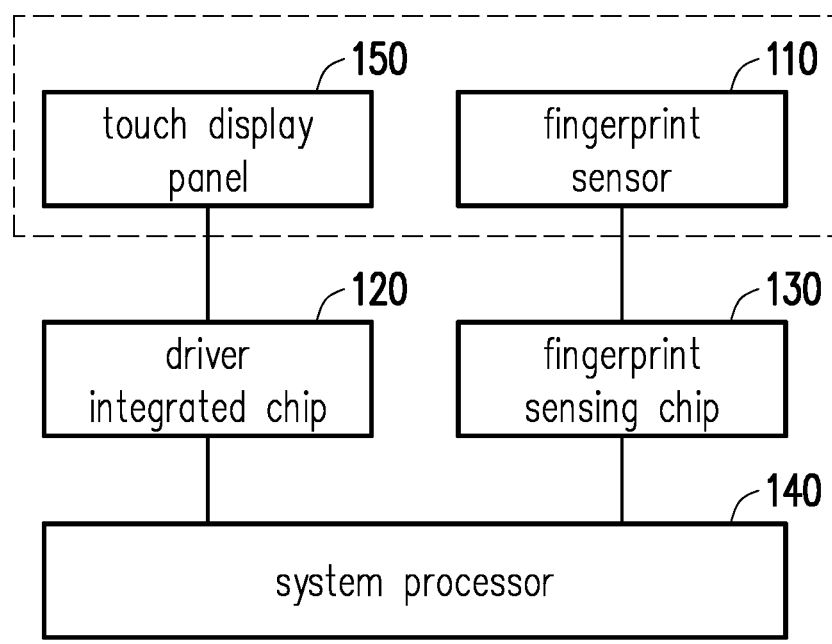
FIG. 1 is a block diagram of a fingerprint sensing device according to an embodiment of the disclosure.

In order for the content of the disclosure to be more comprehensible, the following embodiments are specifically cited as examples on which the disclosure can indeed be implemented. In addition, wherever possible, elements/components/steps with the same reference numerals in the drawings and implementations represent the same or similar parts.

FIG. 1 is a block diagram of a fingerprint sensing device according to an embodiment of the disclosure. Please refer to FIG. 1. A fingerprint sensing device 100 includes a fingerprint sensor 110, a driver integrated chip 120, a fingerprint sensing chip 130, a system processor 140, and a touch display panel 150. The fingerprint sensing device 100 may be a terminal device, which is, for example, an electronic product with a fingerprint sensing function, such as a mobile phone, a notebook computer, a game console, a tablet computer, or a handheld smart device, but the disclosure is not limited thereto.

In an embodiment, a display region of the touch display panel 150 is a touchable region. The user may touch the display region on the fingerprint sensing device 100 through a finger or other touch objects to perform a touch operation.

In addition, the user may also touch the display region on the fingerprint sensing device 100 through a finger to perform a fingerprint verification operation. The touch display panel 150 is a display panel integrated with a touch panel, which may simultaneously provide a display function and a touch input function. The display panel is configured to display a screen according to image data. The display panel may be implemented as an organic light-emitting diode (OLED) display panel, an active matrix organic light-emitting diode (AMOLED) display panel, a liquid crystal display (LCD) display panel, or other types of display panels, but the disclosure is not limited thereto.

On the other hand, in an embodiment, the touch panel in the touch display panel 150 may be a capacitive touch panel. Multiple touch sensing electrodes (not shown) arranged in an array are disposed on the touch panel. The touch panel may be disposed on one side of the display panel, or the touch sensing electrodes of the touch panel and pixel electrodes of the display panel may be disposed on the same substrate, but the disclosure is not limited thereto.

The driver integrated chip 120 is coupled to the touch display panel 150 and is configured to control the operation of the touch display panel 150. The driver integrated chip 120 may be a touch with display driver integration (TDDI) chip. In an embodiment, the driver integrated chip 120 may provide a touch driving signal to the touch display panel 150 to drive each touch sensing electrode to perform touch sensing. Based on this, the touch position of the finger of the user may be determined through detecting the capacitance change on the touch sensing electrodes. In addition, the driver integrated chip 120 may provide a display driving signal to the touch display panel 150. The touch display panel 150 is configured to update the display screen within each frame period according to the display driving signal.

The fingerprint sensor 110 includes multiple fingerprint sensing pixels arranged in an array and is configured to sense fingerprint/palmprint information of the user. In an embodiment, the fingerprint sensing device 100 may use optical fingerprint recognition technology, but the disclosure is not limited thereto. Correspondingly, each fingerprint sensing pixel may include a photodiode for photoelectric conversion to perform fingerprint sensing according to fingerprint rays reflected by the finger. In other words, by illuminating finger through a self-luminous display panel or other illumination elements, the fingerprint sensor 110 may sense reflected light reflected by the finger and having the fingerprint information to generate a fingerprint image. It should be noted that in an embodiment, the fingerprint sensing pixels of the fingerprint sensor 110 may be embedded in the touch display panel 150. For example, the fingerprint sensing pixels and the touch sensing electrodes of the touch display panel 150 may be disposed on the same substrate, but the disclosure is not limited thereto.

The fingerprint sensing chip 130 is coupled to the fingerprint sensor 110 and is configured to drive the fingerprint sensor 110. That is, the fingerprint sensing chip 130 may provide a fingerprint sensing driving signal to the fingerprint sensor 110 to drive the fingerprint sensing pixels in the fingerprint sensor 110 for fingerprint sensing. In addition, the fingerprint sensing chip 130 may acquire a sensing signal reported by the fingerprint sensing pixels in the fingerprint sensor 110 to acquire the fingerprint image.

The system processor 140 is coupled to the driver integrated chip 120 and the fingerprint sensing chip 130, may execute the operating system and application software of the fingerprint sensing device 100, and is, for example, a central processing unit, an application processor, or other processing circuits with computing capabilities. In an embodiment, the system processor 140 may acquire the fingerprint image from the fingerprint sensing chip 130 and perform a fingerprint verification procedure according to the fingerprint image. In an embodiment, the system processor 140 may provide image data to the driver integrated chip 120, so that the driver integrated chip 120 controls the touch display panel 150 to display a corresponding screen according to the image data.

It should be particularly noted that in the embodiment of the disclosure, in order to avoid signal interference phenomenon between touch sensing related signals (such as the touch driving signal) and fingerprint sensing related signals (such as the fingerprint sensing driving signal), the fingerprint sensing device 100 will switch to operate during a fingerprint sensing period or a touch sensing period. When the fingerprint sensing device 100 operates during the fingerprint sensing period, the fingerprint sensing pixels of the fingerprint sensor 110 are driven to perform fingerprint sensing and output a fingerprint sensing result to the fingerprint sensing chip 130. When the fingerprint sensing device 100 operates during the touch sensing period, the touch display panel 150 is driven to perform touch sensing and output a touch sensing result to the driver integrated chip 120. It is conceivable that the fingerprint sensing chip 130 and the driver integrated chip 120 will respectively drive the fingerprint sensor 110 for fingerprint sensing and the touch display panel 150 for touch sensing at different time slots.

That is, the driver integrated chip 120 disables touch sensing during the fingerprint sensing period, and the fingerprint sensing chip 130 drives the fingerprint sensor 110 to obtain the fingerprint image during the fingerprint sensing period. In the embodiment of the disclosure, when the fingerprint sensing chip 130 intends to drive the fingerprint sensor 110 to perform fingerprint sensing, the fingerprint sensing chip 130 may notify the driver integrated chip 120 to disable touch sensing during the fingerprint sensing period.

Figure 2:
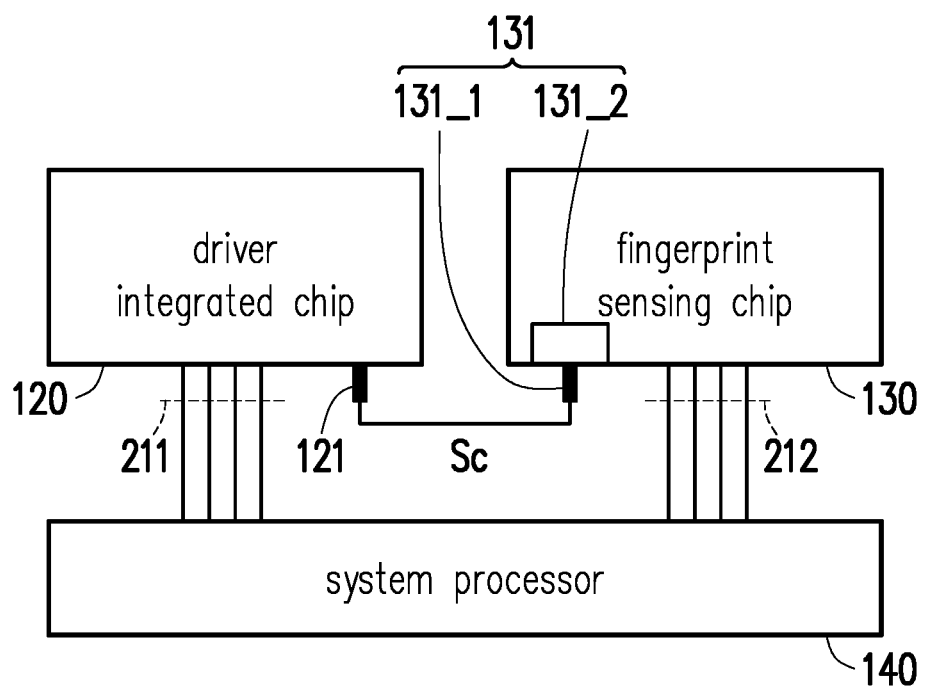
FIG. 2 is a schematic diagram of a fingerprint sensing device according to an embodiment of the disclosure.

FIG. 2 is a schematic diagram of a fingerprint sensing device according to an embodiment of the disclosure. Please refer to FIG. 2. In the embodiment of the disclosure, the fingerprint sensing chip 130 is coupled to the driver integrated chip 120 via a general purpose input/output (GPIO) interface 131. In addition, in the example of FIG. 2, the system processor 140 may communicate with the driver integrated chip 120 and the fingerprint sensing chip 130 according to the serial peripheral interface (SPI) standard, but the disclosure is not limited thereto. In other embodiments, the system processor 140 may communicate with the driver integrated chip 120 and the fingerprint sensing chip 130 according to other interface communication standards. In the example of FIG. 2, the system processor 140 may be connected to the driver integrated chip 120 via an SPI bus 211 and connected to the fingerprint sensing chip 130 via an SPI bus 212.

It should be noted that in the embodiment of the disclosure, the fingerprint sensing chip 130 provides a control signal Sc to the driver integrated chip 120 via the GPIO interface 131 to control the driver integrated chip 120 according to the control signal Sc to disable touch sensing during the fingerprint sensing period. The GPIO interface 131 may include a GPIO pin 131_1 and a GPIO interface circuit 131_2. When the fingerprint sensing chip 130 intends to drive the fingerprint sensor 110 to perform fingerprint sensing, the fingerprint sensing chip 130 may provide the control signal Sc via the GPIO pin 131_1 of the GPIO interface 131 to notify the driver integrated chip 120, so that the driver integrated chip 120 disables touch sensing during the fingerprint sensing period.

In more detail, the fingerprint sensing chip 130 may control the driver integrated chip 120 to disable or enable touch sensing through controlling the signal level of the control signal Sc output by the GPIO pin 131_1. Correspondingly, the driver integrated chip 120 includes a signal receiving pin 121. The signal receiving pin 121 may receive the control signal Sc, and disable or enable the touch display panel 150 for touch sensing according to the signal level of the control signal Sc. In some embodiments, the signal receiving pin 121 may be a GPIO pin that complies with the GPIO standard. The signal receiving pin 121 of the driver integrated chip 120 may be connected to the GPIO pin 131_1 of the fingerprint sensing chip 130 via a conductor line on a circuit substrate. As such, when the fingerprint sensing chip 130 intends to perform fingerprint sensing, the fingerprint sensing chip 130 may quickly control the driver integrated chip 120 via the GPIO interface 131 to disable touch sensing to avoid signal interference between touch sensing and fingerprint sensing, thereby improving the quality of fingerprint sensing.

Figure 3:
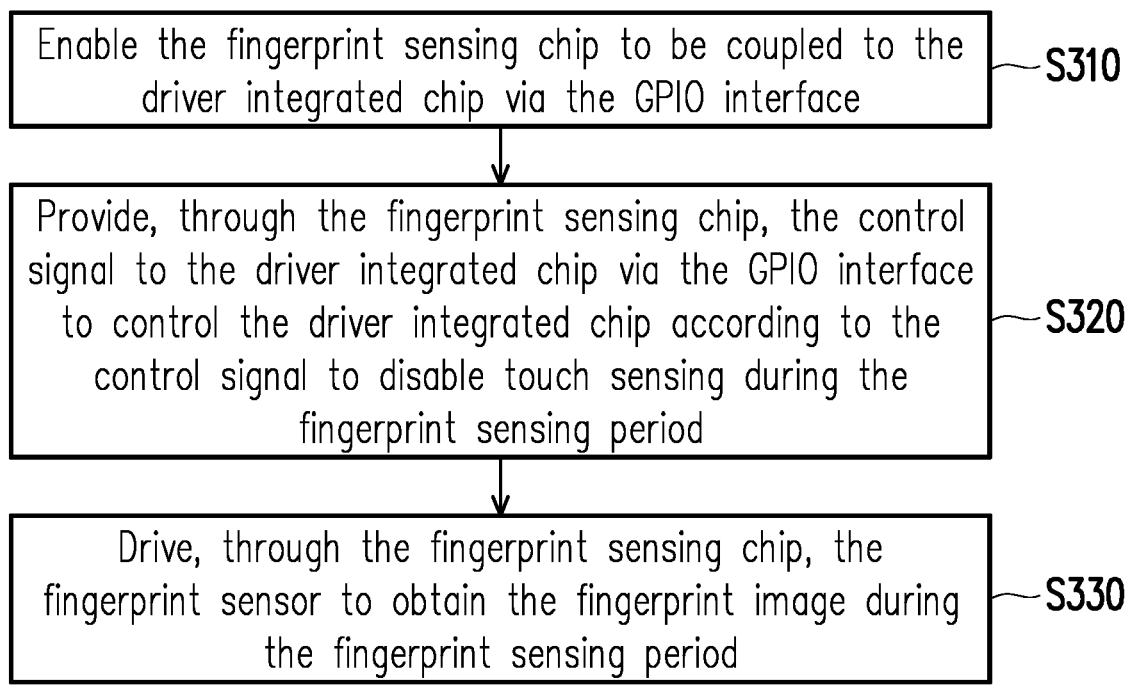
FIG. 3 is a flowchart of an operation method of a fingerprint sensing device according to an embodiment of the disclosure.

FIG. 3 is a flowchart of an operation method of a fingerprint sensing device according to an embodiment of the disclosure. Please refer to FIG. 1 to FIG. 3. In Step S310, the fingerprint sensing chip 130 is coupled to the driver integrated chip 120 via the GPIO interface 131. In Step S320, the fingerprint sensing chip 130 provides the control signal Sc to the driver integrated chip 120 via the GPIO interface 131 to control the driver integrated chip 120 according to the control signal Sc to disable touch sensing during the fingerprint sensing period.

In an embodiment, the driver integrated chip 120 disables touch sensing during the fingerprint sensing period to stop providing the touch driving signal to the touch display panel 150 in response to the control signal Sc being switched from a first signal level to a second signal level. The driver integrated chip 120 enables touch sensing during the touch sensing period to provide the touch driving signal to the touch display panel 150 in response to the control signal Sc being switched from the second signal level to the first signal level. The first signal level and the second signal level may respectively be a low level and a high level. In an embodiment, if the first signal level is the low level, the second signal level is the high level. In another embodiment, if the first signal level is the high level, the second signal level is the low level.

For example, when the fingerprint sensing chip 130 outputs the control signal Sc at the high level via the GPIO pin 131_1, the driver integrated chip 120 stops providing the touch driving signal to the touch sensing electrodes of the touch display panel 150 during the fingerprint sensing period in response to receiving the control signal Sc at the high level. Conversely, when the fingerprint sensing chip 130 outputs the control signal Sc at the low level via the GPIO pin 131_1, the driver integrated chip 120 provides the touch driving signal to the touch sensing electrodes of the touch display panel 150 during the touch sensing period in response to receiving the control signal Sc at the low level.

In Step S330, the fingerprint sensor 110 is driven to obtain the fingerprint image through the fingerprint sensing chip 130 during the fingerprint sensing period. Specifically, after the fingerprint sensing chip 130 controls the driver integrated chip 120 via the GPIO interface 131 to disable touch sensing, the fingerprint sensing chip 130 drives a part or all of the fingerprint sensing pixels in the fingerprint sensor 110 to obtain the fingerprint image during the fingerprint sensing period. In an embodiment, after the fingerprint sensing chip 130 obtains the fingerprint image, the fingerprint sensing chip 130 may control the signal level of the control signal Sc output by the GPIO interface 131, so that the driver integrated chip 120 resumes driving the touch display panel 150 to perform touch sensing.

It should be noted that compared to the embodiment of the disclosure whereby the fingerprint sensing chip 130 directly notifies the driver integrated chip 120 through the GPIO interface 131 to disable touch sensing, if the system processor 140 notifies the driver integrated chip 120 via the SPI bus 211 to disable touch sensing, the driver integrated chip 120 will inevitably need to spend more time to execute other communication operations with the system processor 140 or the fingerprint sensing chip 130 subsequently to ensure that the fingerprint sensing chip 130 performs fingerprint under the condition that touch sensing is disabled. In addition, compared to the transmission interface standard that requires a handshake procedure (for example, the SPI standard), the GPIO interface may provide a communication manner with higher efficiency and low noise interference. Therefore, the embodiment of the disclosure enables the user to experience a quicker fingerprint sensing function.

It should be noted that the fingerprint sensing chip 130 may need to drive the fingerprint sensor 110 to perform fingerprint sensing in different operating situations, which will be described in the embodiments exemplified below.

Figure 4:
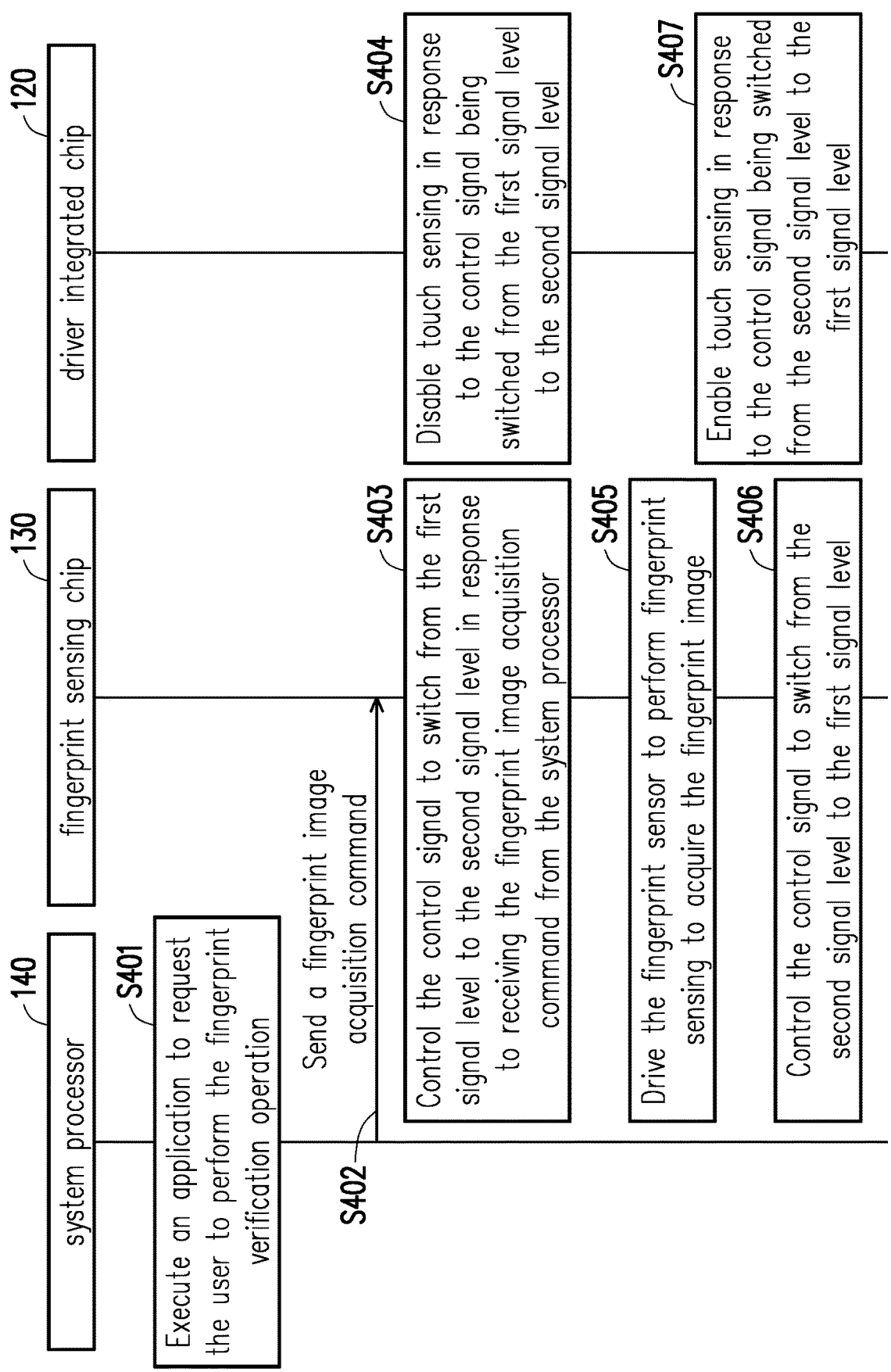
FIG. 4 is a flowchart of an operation method of a fingerprint sensing device according to an embodiment of the disclosure.

FIG. 4 is a flowchart of an operation method of a fingerprint sensing device according to an embodiment of the disclosure. Please refer to FIG. 2 and FIG. 4. In Step S401, the system processor 140 executes an application to request the user to perform the fingerprint verification operation. The application is, for example, a stock trading application, an online banking application, etc. In Step S402, the system processor 140 sends a fingerprint image acquisition command to the fingerprint sensing chip 130 via the SPI bus 212. In Step S403, the fingerprint sensing chip 130 controls the control signal Sc to switch from the first signal level to the second signal level in response to receiving the fingerprint image acquisition command from the system processor 140.

In Step S404, the driver integrated chip 120 disables touch sensing in response to the control signal Sc being switched from the first signal level to the second signal level. In other words, the fingerprint sensing chip 130 controls the driver integrated chip 120 according to the control signal Sc to disable touch sensing during the fingerprint sensing period in response to receiving the fingerprint image acquisition command from the system processor 140. In Step S405, the fingerprint sensing chip 130 drives the fingerprint sensor 110 to perform fingerprint sensing to acquire the fingerprint image. In Step S406, the fingerprint sensing chip 130 controls the control signal Sc to switch from the second signal level to the first signal level. In Step S407, the driver integrated chip 120 enables touch sensing in response to the control signal Sc being switched from the second signal level to the first signal level.

Figure 5:
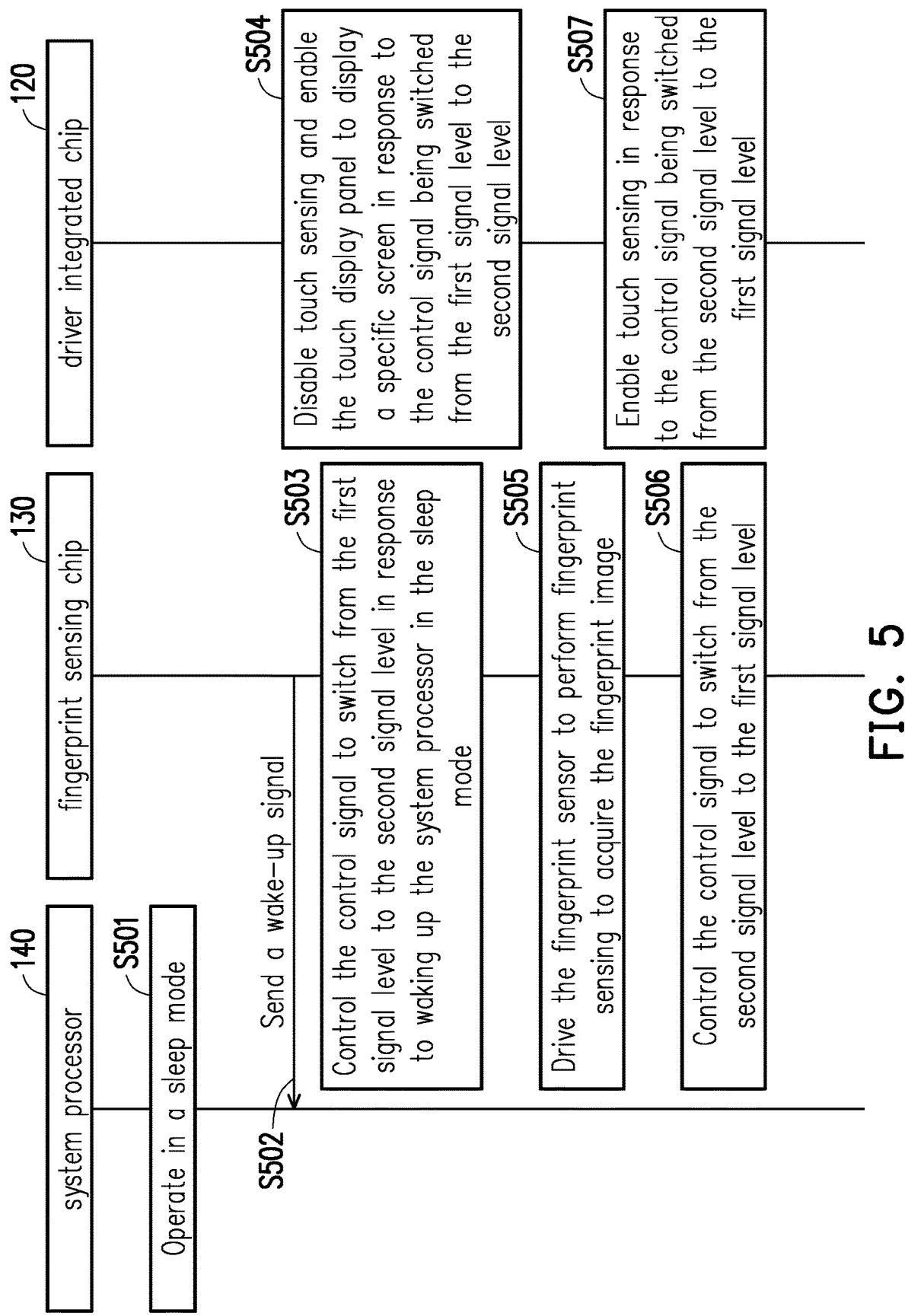
FIG. 5 is a flowchart of an operation method of a fingerprint sensing device according to an embodiment of the disclosure.

FIG. 5 is a flowchart of an operation method of a fingerprint sensing device according to an embodiment of the disclosure. Please refer to FIG. 2 and FIG. 5. In Step S501, when the fingerprint sensing device 100 is in a standby state, the system processor 140 operates in a sleep mode. In Step S502, the fingerprint sensing chip 130 sends a wake-up signal to the system processor 140 to wake up the system processor 140 in the sleep mode. In an embodiment, when the fingerprint sensor 110 senses that the finger of the user is approaching, touching, or pressing the touch display panel 150, the fingerprint sensing chip 130 may send the wake-up signal to the system processor 140 via the SPI bus 212 to wake up the system processor 140.

In Step S503, the fingerprint sensing chip 130 controls the control signal Sc to switch from the first signal level to the second signal level in response to waking up the system processor 140 in the sleep mode. In Step S504, the driver integrated chip 120 disables touch sensing and enables the touch display panel 150 to display a specific screen in response to the control signal Sc being switched from the first signal level to the second signal level. In other words, the fingerprint sensing chip 130 controls the driver integrated chip 120 according to the control signal Sc to disable touch sensing during the fingerprint sensing period in response to waking up the system processor 140 in the sleep mode.

It is worth mentioning that the fingerprint sensing chip 130 controls the control signal Sc to switch from the first signal level to the second signal level, and the driver integrated chip 120 may enable the touch display panel 150 to display a specific screen according to the control signal Sc in response to the fingerprint sensing chip 130 waking up the system processor 140 in the sleep mode. In detail, during the period when the system processor 140 is in the sleep mode, the driver integrated chip 110 may control the touch display panel 150 to display a black screen. The driver integrated chip 120 may control the touch display panel 150 to switch from displaying the black screen to displaying a specific screen according to the signal level of the control signal Sc in response to the fingerprint sensing chip 130 waking up the system processor 140 in the sleep mode. The specific screen is, for example, a lock screen that prompts the user to perform the fingerprint verification operation, but the disclosure is not limited thereto.

Next, in Step S505, the fingerprint sensing chip 130 drives the fingerprint sensor 110 to perform fingerprint sensing to acquire the fingerprint image. In Step S506, the fingerprint sensing chip 130 controls the control signal Sc to switch from the second signal level to the first signal level. In Step S507, the driver integrated chip 120 enables touch sensing in response to the control signal Sc being switched from the second signal level to the first signal level.

Figure 6:
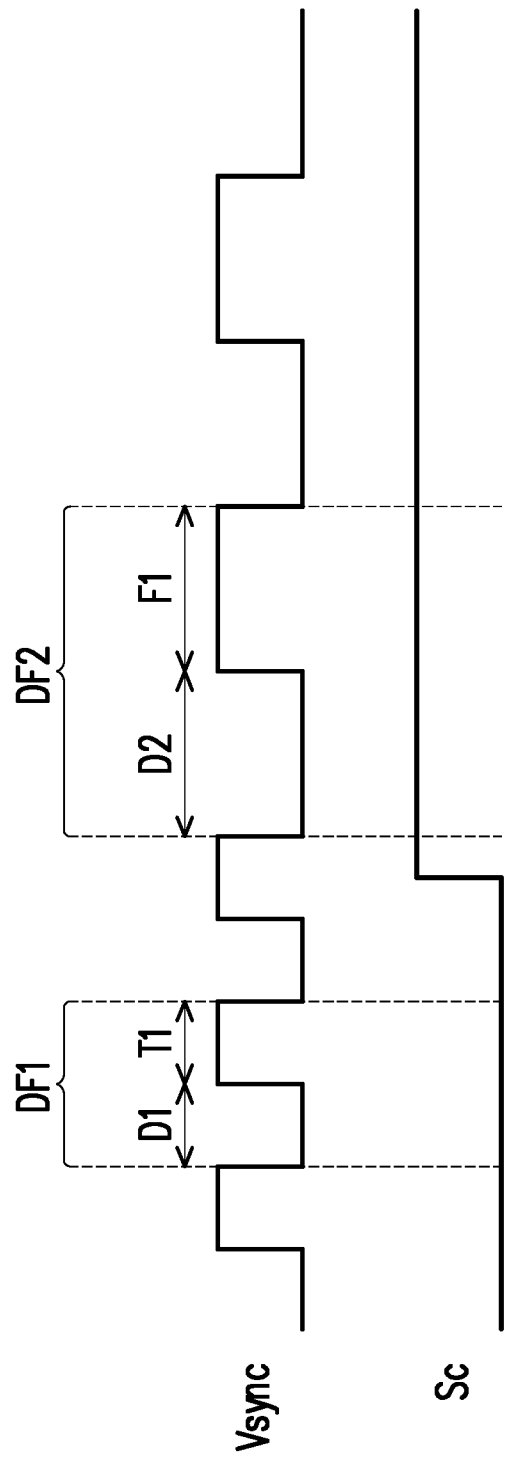
FIG. 6 is a timing diagram of an operation of a fingerprint sensing device according to an embodiment of the disclosure.

FIG. 6 is a timing diagram of an operation of a fingerprint sensing device according to an embodiment of the disclosure. Please refer to FIG. 6. In an embodiment, the driver integrated chip 120 may provide a touch display synchronization signal Vsync (or referred to as a frame synchronization signal) to the fingerprint sensing chip 130. When the control signal Sc is at the low level, the touch display synchronization signal Vsync with a first synchronization frequency may define a display frame period DF1. The driver integrated chip 120 may complete a display driving operation of one display frame during one display frame period DF1. One display frame period DF1 may include one or more display driving periods and one or more touch sensing periods (here, one display driving period D1 and one touch sensing period T1 are exemplified for illustration, but the disclosure is not limited thereto). The driver integrated chip 120 may drive the touch display panel 150 to execute touch sensing during the touch sensing period T1.

The touch display synchronization signal Vsync is switched from the first synchronization frequency to a second synchronization frequency in response to a change in the signal level of the control signal Sc output by the GPIO interface 131. The touch display synchronization signal Vsync with the second synchronization frequency may define a display frame period DF2. The driver integrated chip 120 may complete the display driving operation of one display frame during one display frame period DF2. In an embodiment, the second synchronization frequency is lower than the first synchronization frequency. For example, the first synchronization frequency may be 60 Hz and the second synchronization frequency may be 30 Hz.

In the example of FIG. 6, the signal frequency of the touch display synchronization signal Vsync is reduced from the first synchronization frequency to the second synchronization frequency, the driver integrated chip 120 disables touch sensing, and the fingerprint sensing chip 130 drives the fingerprint sensor 110 according to the touch display synchronization signal Vsync with the second synchronization frequency in response to the control signal Sc output by the GPIO interface 131 being switched from the low level to the high level. One display frame period DF2 may include one or more display driving periods and one or more fingerprint sensing periods (here, one display driving period D2 and one touch sensing period F1 are exemplified for illustration, but the disclosure is not limited thereto). The fingerprint sensing chip 130 may drive the fingerprint sensor 110 to execute fingerprint sensing during the fingerprint sensing period F1.

However, the example of FIG. 6 is only an exemplary illustration and is not intended to limit the disclosure. The time lengths of the display driving period, the touch sensing period, and the fingerprint sensing period may be designed according to actual applications, and the disclosure is not limited thereto.

In addition, it should be noted that after the fingerprint sensing chip 130 performs fingerprint sensing to obtain the fingerprint image, the system processor 140 also needs to perform the fingerprint verification procedure according to the fingerprint image. Therefore, the display screen of the touch display panel 150 generally updates a display content in response to the fingerprint verification procedure being completed. Therefore, when the fingerprint sensing chip 130 performs fingerprint sensing, the update speed of the screen may be reduced through reducing the signal frequency of the touch display synchronization signal Vsync, thereby achieving the effect of reducing power consumption.

In summary, in the embodiments of the disclosure, the fingerprint sensing chip communicates with the driver integrated chip through the GPIO interface. The fingerprint sensing chip may output the control signal to the driver integrated chip via the GPIO pins of the GPIO interface, so that the driver integrated chip may disable the touch display panel for touch sensing according to the signal level of the control signal to avoid undesirable interference of touch sensing to fingerprint sensing, thereby improving the quality of fingerprint sensing. In addition, by using the fingerprint sensing chip to directly control the driver integrated chip through the GPIO interface to disable or enable touch sensing, the embodiments of the disclosure have the effect of quickly completing the fingerprint sensing operation, thereby improving the user experience. In addition, the signal frequency of the touch display synchronization signal for determining the length of the display frame period may be reduced in response to the change in the signal level of the control signal output by the GPIO interface, thereby achieving the effect of saving power consumption.

Finally, it should be noted that the above embodiments are only used to illustrate but not to limit the technical solutions of the disclosure. Although the disclosure has been described in detail with reference to the foregoing embodiments, persons skilled in the art should understand that they may still modify the technical solutions described in the foregoing embodiments or equivalently replace some or all of the technical features. However, the modifications or replacements do not cause the spirit of the corresponding technical solution to deviate from the scope of the technical solution according to each embodiment of the disclosure.

What is claimed is:

1. A fingerprint sensing device, comprising:
a fingerprint sensor;
a driver integrated chip; and
a fingerprint sensing chip, coupled to the fingerprint sensor, and coupled to the driver integrated chip via a general purpose input/output (GPIO) interface, wherein
the fingerprint sensing chip provides a control signal to the driver integrated chip via the GPIO interface to control the driver integrated chip according to the control signal to disable touch sensing during a fingerprint sensing period, and drive the fingerprint sensor to obtain a fingerprint image during the fingerprint sensing period.

2. The fingerprint sensing device according to claim 1, wherein the driver integrated chip disables touch sensing during the fingerprint sensing period to stop providing a touch driving signal to a touch display panel in response to the control signal being switched from a first signal level to a second signal level.

3. The fingerprint sensing device according to claim 2, wherein the driver integrated chip enables touch sensing during a touch sensing period to provide the touch driving signal to the touch display panel in response to the control signal being switched from the second signal level to the first signal level.

4. The fingerprint sensing device according to claim 1, further comprising a system processor, coupled to the fingerprint sensing chip, wherein
the fingerprint sensing chip controls the driver integrated chip according to the control signal to disable touch sensing during the fingerprint sensing period in response to receiving a fingerprint image acquisition command from the system processor.

5. The fingerprint sensing device according to claim 1, further comprising a system processor, coupled to the fingerprint sensing chip, wherein
the fingerprint sensing chip controls the driver integrated chip according to the control signal to disable touch sensing during the fingerprint sensing period in response to waking up the system processor in a sleep mode.

6. The fingerprint sensing device according to claim 5, wherein the driver integrated chip enables a touch display panel to display a screen according to the control signal in response to waking up the system processor in the sleep mode.

7. The fingerprint sensing device according to claim 1, wherein the driver integrated chip provides a touch display synchronization signal to the fingerprint sensing chip, the touch display synchronization signal is switched from a first synchronization frequency to a second synchronization frequency in response to a change in a signal level of the control signal, and the fingerprint sensing chip drives the fingerprint sensor according to the touch display synchronization signal with the second synchronization frequency.

8. The fingerprint sensing device according to claim 7, wherein the second synchronization frequency is lower than the first synchronization frequency.

9. An operation method of a fingerprint sensing device, wherein the fingerprint sensing device comprises a fingerprint sensor, a fingerprint sensing chip, and a driver integrated chip, the operation method comprising:
enabling the fingerprint sensing chip to be coupled to the driver integrated chip via a GPIO interface;
providing, through the fingerprint sensing chip, a control signal to the driver integrated chip via the GPIO interface to control the driver integrated chip according to the control signal to disable touch sensing during a fingerprint sensing period; and
driving, through the fingerprint sensing chip, the fingerprint sensor to obtain a fingerprint image during the fingerprint sensing period.

10. The operation method according to claim 9, wherein the step of providing, through the fingerprint sensing chip, the control signal to the driver integrated chip via the GPIO interface to control the driver integrated chip according to the control signal to disable touch sensing during the fingerprint sensing period comprises:
disabling, through the driver integrated chip, touch sensing during the fingerprint sensing period to stop providing a touch driving signal to a touch display panel in response to the control signal being switched from a first signal level to a second signal level.

11. The operation method according to claim 10, wherein the step of providing, through the fingerprint sensing chip, the control signal to the driver integrated chip via the GPIO interface to control the driver integrated chip according to the control signal to disable touch sensing during the fingerprint sensing period comprises:
enabling, through the driver integrated chip, touch sensing during a touch sensing period to provide the touch driving signal to the touch display panel in response to the control signal being switched from the second signal level to the first signal level.

12. The operation method according to claim 9, wherein the fingerprint sensing device further comprises a system processor, and the step of providing, through the fingerprint sensing chip, the control signal to the driver integrated chip via the GPIO interface to control the driver integrated chip according to the control signal to disable touch sensing during the fingerprint sensing period comprises:
controlling, through the fingerprint sensing chip, the driver integrated chip according to the control signal to disable touch sensing during the fingerprint sensing period in response to receiving a fingerprint image acquisition command from the system processor.

13. The operation method according to claim 9, wherein the fingerprint sensing device further comprises a system processor, and the step of providing, through the fingerprint sensing chip, the control signal to the driver integrated chip via the GPIO interface to control the driver integrated chip according to the control signal to disable touch sensing during the fingerprint sensing period comprises:
controlling, through the fingerprint sensing chip, the driver integrated chip according to the control signal to disable touch sensing during the fingerprint sensing period in response to waking up the system processor in a sleep mode.

14. The operation method according to claim 13, wherein the step of providing, through the fingerprint sensing chip, the control signal to the driver integrated chip via the GPIO interface to control the driver integrated chip according to the control signal to disable touch sensing during the fingerprint sensing period further comprises:
enabling, through the driver integrated chip, a touch display panel to display a screen according to the control signal in response to waking up the system processor in the sleep mode.

15. The operation method according to claim 9, further comprising:
- providing, through the driver integrated chip, a touch display synchronization signal to the fingerprint sensing chip, wherein the touch display synchronization signal is switched from a first synchronization frequency to a second synchronization frequency in response to a change in a signal level of the control signal; and
- driving, through the fingerprint sensing chip, the fingerprint sensor according to the touch display synchronization signal with the second synchronization frequency in response to the change in the signal level of the control signal.

\* \* \* \* \*